(12) United States Patent
Lee et al.

(10) Patent No.: US 8,456,862 B2
(45) Date of Patent: Jun. 4, 2013

(54) ELECTRONIC DEVICE WITH SUPPORTING APPARATUS

(75) Inventors: Guang-Yao Lee, New Taipei (TW); Yi-Sheng Lin, New Taipei (TW); Bin Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 143 days.

(21) Appl. No.: 13/213,101

(22) Filed: Aug. 19, 2011

(65) Prior Publication Data

US 2012/0243196 A1 Sep. 27, 2012

(30) Foreign Application Priority Data

Mar. 25, 2011 (CN) .......................... 2011 1 0073018

(51) Int. Cl.
*H05K 7/02* (2006.01)

(52) U.S. Cl.
USPC ................ 361/807; 361/679.01; 361/679.22; 361/679.39; 361/679.43; 361/679.44

(58) Field of Classification Search
USPC ............. 361/679.01, 679.02, 679.21, 679.22, 361/679.39, 679.43, 679.44, 679.58, 807, 361/810, 825; 248/157, 161, 125.1, 200, 248/429, 425, 675
See application file for complete search history.

(56) References Cited

U.S. PATENT DOCUMENTS

| | | | |
|---|---|---|---|
| 7,694,929 B2 * | 4/2010 | Jang ........................... | 248/372.1 |
| 8,144,452 B2 * | 3/2012 | Huang et al. ............. | 361/679.02 |
| 8,313,074 B2 * | 11/2012 | Wang ....................... | 248/295.11 |
| 2010/0214729 A1 * | 8/2010 | Dittmer et al. ........... | 361/679.01 |
| 2011/0058322 A1 * | 3/2011 | Lee et al. ................. | 361/679.01 |

* cited by examiner

*Primary Examiner* — Tuan T Dinh
*Assistant Examiner* — Hung Dang
(74) *Attorney, Agent, or Firm* — Altis Law Group, Inc.

(57) ABSTRACT

A device includes a mounting apparatus and a supporting apparatus. The mounting apparatus includes a fixing bracket, an engaging member slidably mounted to the fixing bracket, and an operation member mounted to the engaging member. The fixing bracket defines first and second engaging holes. The supporting apparatus includes a connecting bracket detachably mounted to the fixing bracket. The fixing bracket defines a connecting hole. The connecting bracket comprises a hook. The engaging member comprises a stop piece. The operation member forms a projection. When the engaging member is slid to engage the projection into the first engaging hole, the stop piece moves away from the connecting hole and the first hook extends through the connecting hole. The engaging member is slid to engage the projection in the second engaging hole, the stop piece moves between the connecting hole and the hook to engage with the hook.

13 Claims, 10 Drawing Sheets

ELECTRONIC DEVICE WITH SUPPORTING APPARATUS

CROSS-REFERENCE OF RELATED APPLICATIONS

Relevant subject matter is disclosed in a pending U.S. patent application, both titled "ELECTRONIC DEVICE WITH SUPPORTING APPARATUS", with the application Ser. Nos. 13/198,730 and 13/211,275, respectively filed on Aug. 5, 2011, and Aug. 16, 2011, which are assigned to the same assignee as this patent application.

BACKGROUND

1. Technical Field

The present disclosure relates to electronic devices, and particularly, to an electronic device having a supporting apparatus.

2. Description of Related Art

An electronic device, such as an all-in-one computer or a liquid crystal display, is secured to a supporting mechanism by a plurality of fasteners or screws. However, it is time-consuming and often difficult to disassemble the supporting mechanism from the electronic device when the electronic device is to be hung on a wall.

BRIEF DESCRIPTION OF THE DRAWINGS

The components of the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
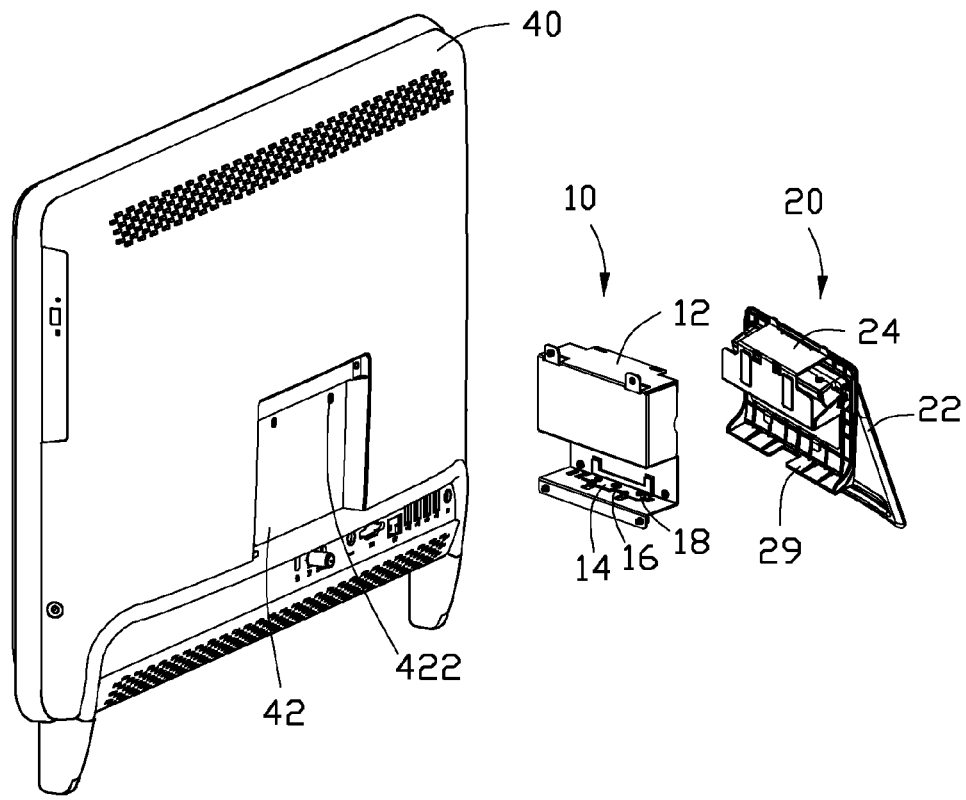
FIG. 1 is an exploded, isometric view of an exemplary embodiment of an electronic device, wherein the electronic device includes a mounting apparatus and a supporting apparatus.

Referring to FIG. 1, an embodiment of an electronic device includes a main body 40, a mounting apparatus 10 fixed to the main body 40, and a supporting apparatus 20 detachably latched to the mounting apparatus 10. A rectangular recess 42 is defined in a rear side of the main body 40. Four screw holes 422 are defined in the base of the recess 42. In the embodiment, the main body 40 is part of an all-in-one computer.

Figure 2:
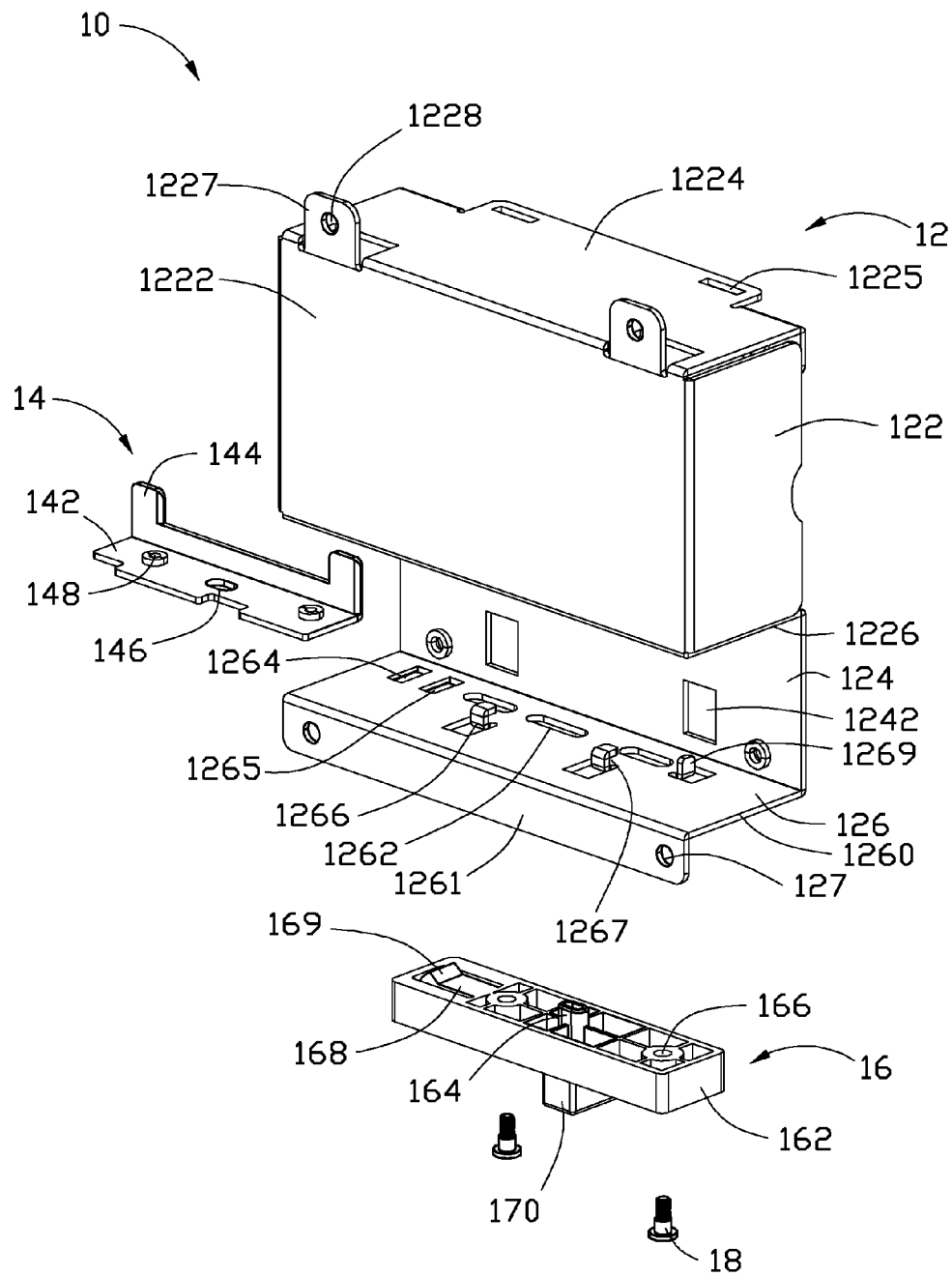
FIG. 2 is an exploded, isometric view of the mounting apparatus of FIG. 1.
Figure 3:
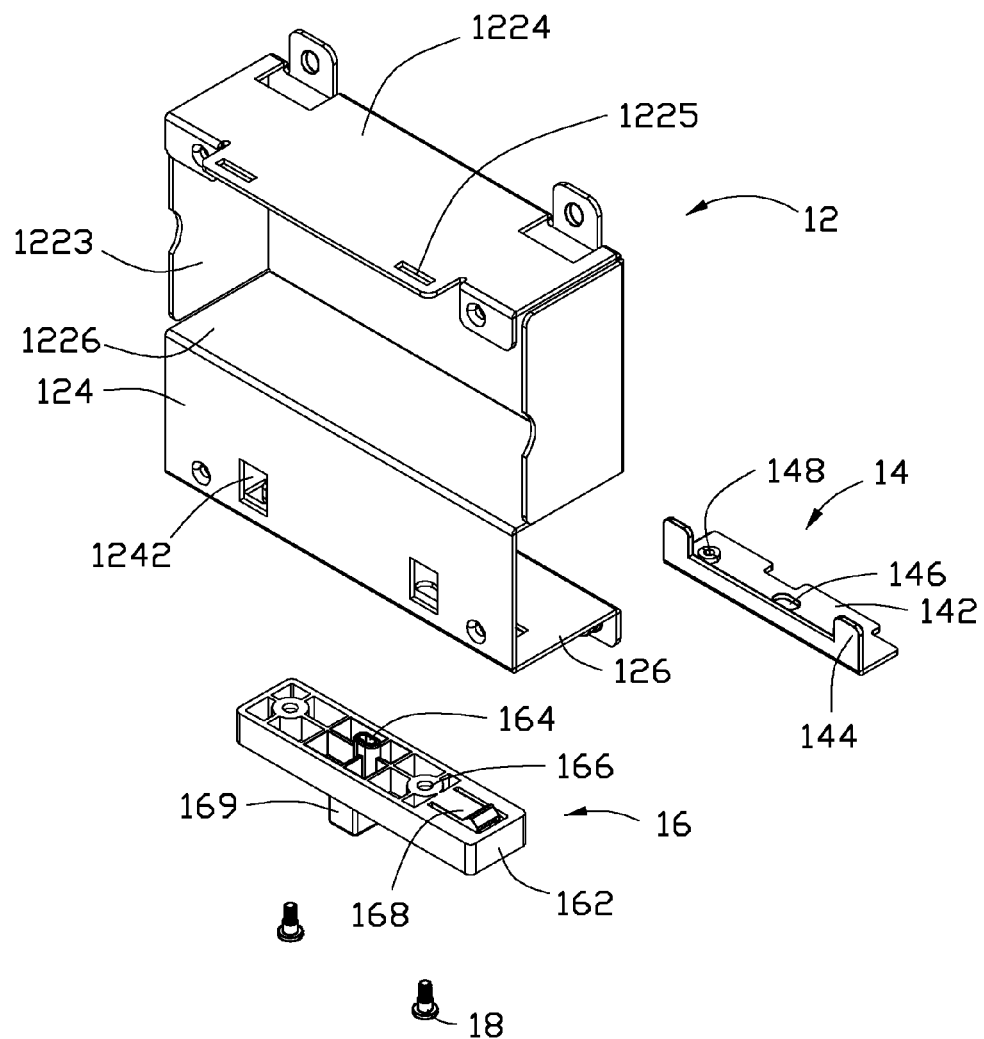
FIG. 3 is similar to FIG. 2, but viewed from another perspective.

Referring to FIGS. 2-3, the mounting apparatus 10 includes a fixing bracket 12, an engaging member 14, an operation member 16, and two screws 18.

The fixing bracket 12 includes a frame 122 with a rectangular box-shape. The frame 122 defines an opening in the rear side. The frame 122 includes a rectangular front wall 1222 opposite to the opening, a top wall 1224 perpendicularly extending rearward from the top of the front wall 1222, and a bottom wall 1226 perpendicularly extending rearward from the bottom of the front wall 1222. The front wall 1222, the top wall 1224, and the bottom wall 1226 cooperatively form a receiving space 1223. Two tabs 1227 extend up from the top side of the front wall 1222, and each tab 1227 defines a fastening hole 1228. Two latching holes 1225 are defined in the rear side of the top wall 1224.

A connecting panel 124 perpendicularly extends down from the rear side of the bottom wall 1226. Two connecting holes 1242 are defined in a lower portion of the connecting panel 124. An L-shaped supporting portion 126 extends from the bottom of the connecting panel 124. The supporting portion 126 includes a rectangular supporting plate 1260 perpendicularly extending forward from the bottom of the connecting panel 124, and an extension plate 1261 perpendicularly extending down from a front side of the supporting panel 1260. Two L-shaped hooks 1266 extend up from a middle of the supporting plate 1260, with a distal end of each hook 1266 faces to the connecting panel 124. The supporting panel 1260 and the hooks 1266 cooperatively form a slide slot 1267. Three elongated and longitudinally-aligned slide holes 1262 are defined in the supporting panel 1260, between the connecting panel 124 and the hooks 1266. A first engaging hole 1264 and a second engaging hole 1265 are defined in a first end of the supporting panel 1260, the first and second engaging hole 1264 and 1265 are in alignment with the slide holes 1262. An engaging piece 1269 extends up from a second end of the supporting panel 1260 opposite to the first end. Two fastening holes 127 are defined in the extension plate 1261.

The engaging member 14 includes a rectangular sliding panel 142. Two stop pieces 144 perpendicularly extend up from a rear side of the sliding panel 142. A fixing hole 146 is defined in a middle of the sliding panel 142. Two screw holes 148 are respectively defined in two opposite ends of the sliding panel 142, in alignment with the fixing hole 146.

the operation member 16 includes a substantially rectangular sliding plate 162. A fixing pole 164 extends up from a middle of the sliding plate 162. Two through holes 166 are defined in the sliding plate 162, respectively at two opposite sides of the fixing pole 164. A resilient tongue 168 is formed at an end of the sliding plate 162, and a wedge-shaped projection 169 extends up from a distal end of the tongue 168. An operation block 170 extends down from the sliding plate 162, between the through holes 166.

Figure 5:
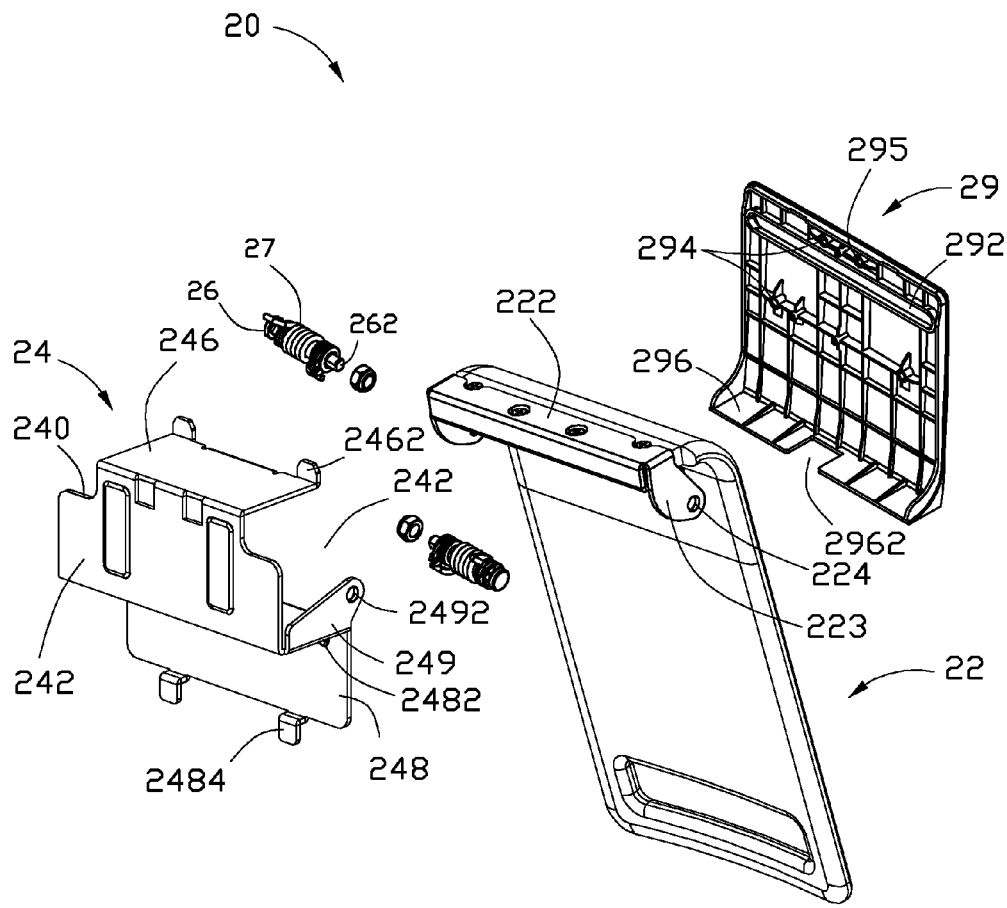
FIG. 5 is an exploded, isometric view of the supporting apparatus of FIG. 1, wherein the supporting apparatus includes a connecting bracket.
Figure 6:
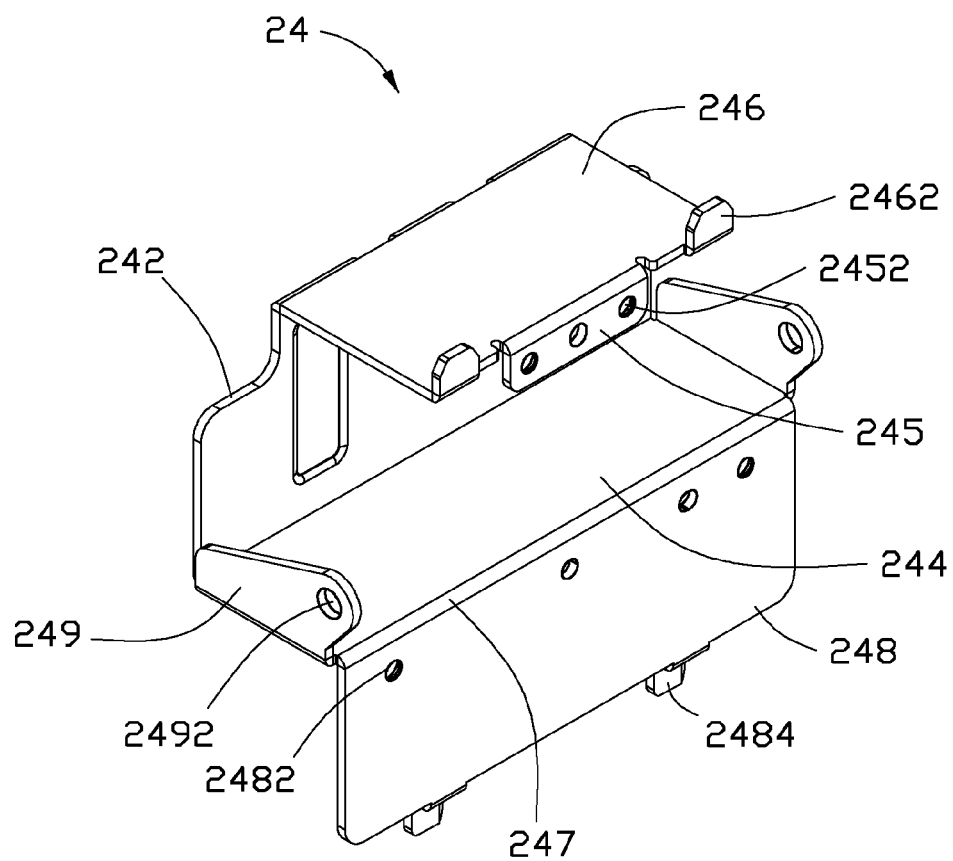
FIG. 6 is an enlarged, isometric view of the connecting bracket of FIG. 5, but viewed from another perspective.

Referring to FIGS. 5-6, the supporting apparatus 20 includes a supporting bracket 22, a connecting bracket 24, two shaft members 26, and a cover 29.

The supporting bracket 22 is substantially L-shaped, with a connecting portion 222 extending from a first end of the supporting bracket 22. Two pivoting plates 223 respectively extend from two opposite ends of the connecting portion 222. A shaft hole 224 is defined in each pivoting plate 223.

The connecting bracket 24 includes a substantially U-shaped receiving portion 240. The receiving portion 240 includes a rectangular front wall 242, a top wall 246 perpendicularly extending rearward from the top of the front wall 242, and a bottom wall 244 perpendicularly extending rearward from the bottom of the front wall 242. The front wall 242, the top wall 246, and the bottom wall 244 cooperatively form a receiving space 243 for receiving the connecting portion 222 of the supporting bracket 22. A first fixing plate 245 perpendicularly extends down from a middle of the rear side of the top wall 246, and defines two fixing holes 2452 therein. Two protrusions 2462 perpendicularly protrude up from the rear side of the top wall 246, at opposite ends of the first fixing plate 245. A second fixing plate 248 perpendicularly extends down from the rear side of the bottom wall 244. Two fixing holes 2482 are defined in the second fixing plate 248. Two L-shaped hooks 2484 extend down from the bottom side of the second fixing plate 248, opposite to the front wall 242. Two connecting plates 249 extend up from two opposite ends of the bottom wall 244, respectively. Each connecting plate 249 defines a shaft hole 2492 therein.

Each shaft member 26 includes a shaft 262 and a torsion spring 27 fitting about the shaft 262.

The cover 29 is substantially rectangular, and defines a long opening 292 in the upper portion of the cover 29. Four columns 294 protrude from the front surface of the cover 29, above and below the opening 292, respectively. A screw hole 295 is axially defined in each column 294. A rectangular bottom plate 296 extends forward from a bottom side of the cover 29. A cutout 2962 is defined in a middle of the bottom plate 296.

Figure 4:
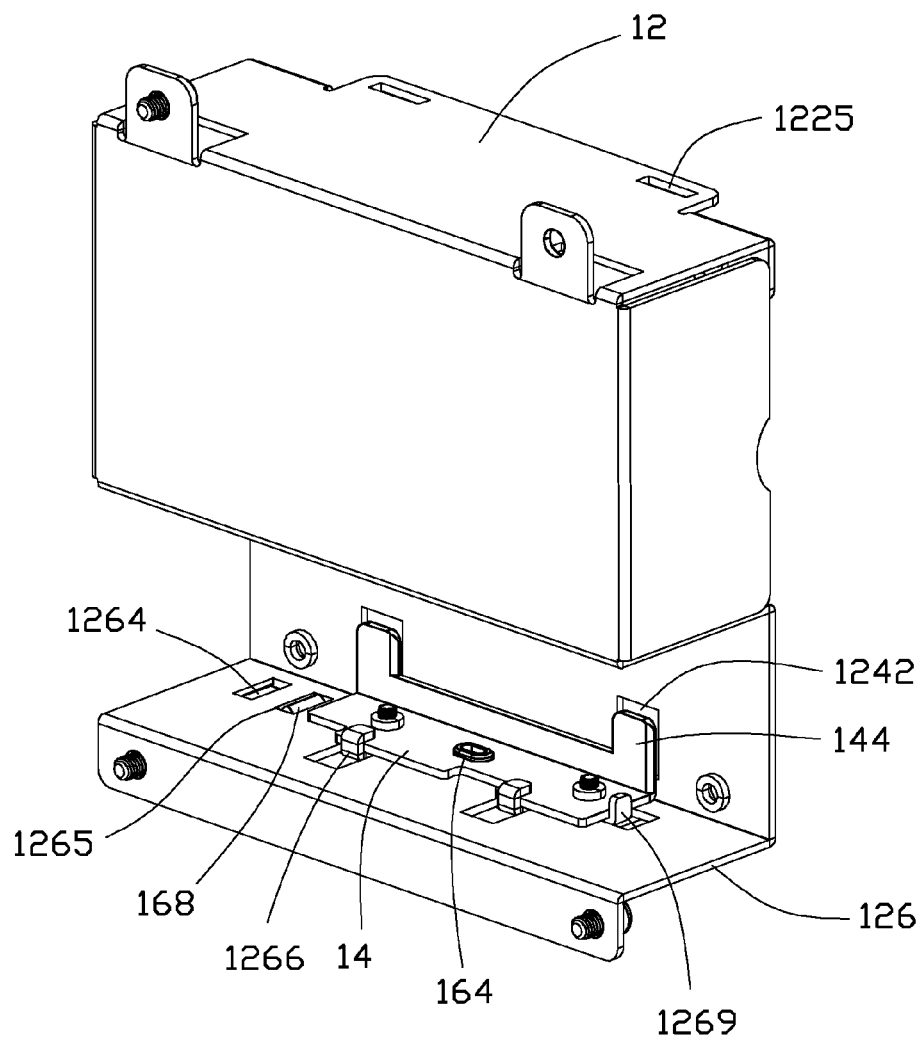
FIG. 4 is an assembled, isometric view of the mounting apparatus of FIG. 2.

Referring to FIGS. 2-4, in assembly of the mounting apparatus 10, the sliding panel 142 of the engaging member 14 is slidably inserted into the slide slot 1267 of the supporting portion 126, from the end with the first engaging hole 1264. The stop pieces 144 are attached to the front surface of the connecting panel 124. The fixing pole 164 slidably extends through the slide hole 1262, to be fixed into the fixing hole 146. The screws 18 slidably extend through the other two slide holes 1262, to be screwed into the corresponding screw holes 148. The engaging member 14 is then slidably mounted to the fixing bracket 12. The stop pieces 144 can move to align with the connecting holes 1242 or misalign with the connecting holes 1242. The projection 169 is latched into either the first engaging hole 1264 when the stop pieces 144 misalign with the connecting holes 1242, or the second engaging hole 1265 when the stop pieces 144 align with the connecting holes 1242.

Figure 10:
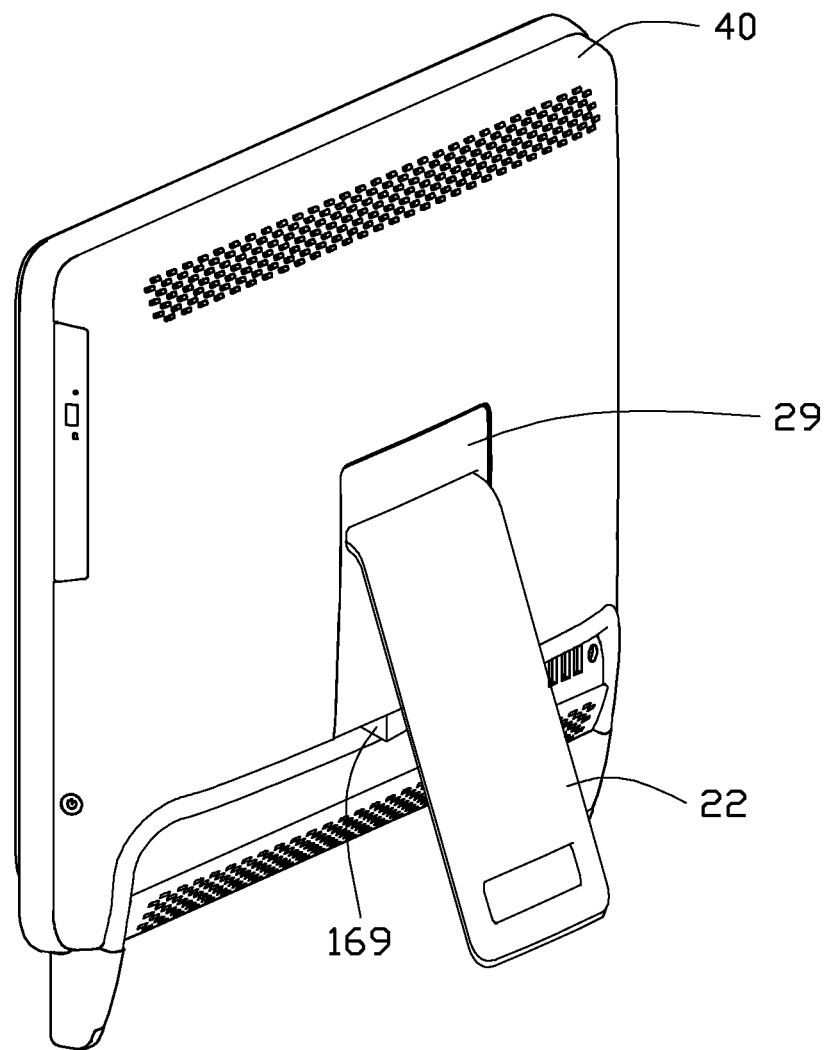
FIG. 10 is an assembled, isometric view of the electronic device of FIG. 1.

Referring to FIG. 1 and FIG. 10, in assembly of the mounting apparatus 10 to the main body 40, the front wall 1222 is received in the recess 42. Four screws extend through the fastening holes 1228 and 127, to be screwed into the corresponding screw holes 422. The operation portion 170 is exposed out the bottom of the main body 40.

Figure 7:
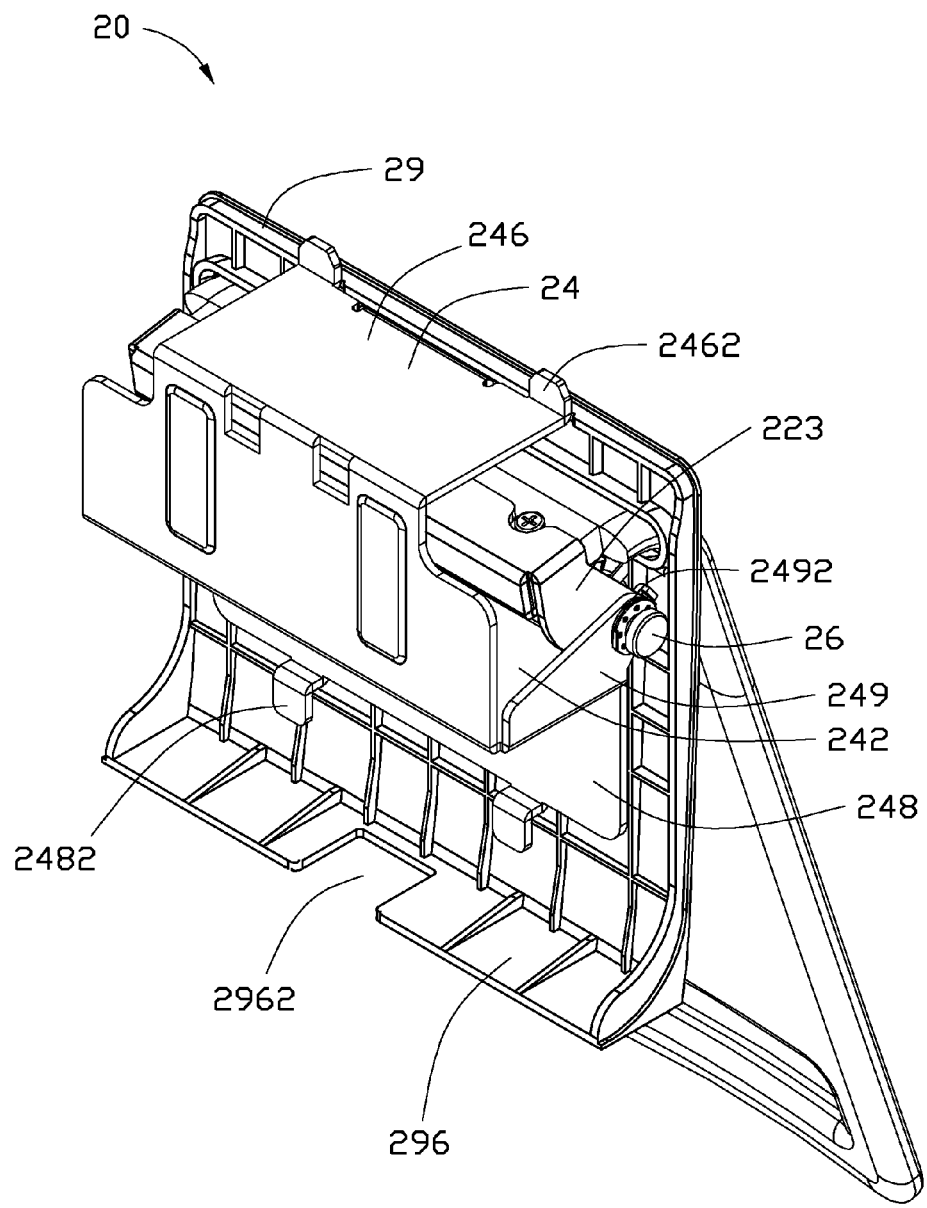
FIG. 7 is an assembled, isometric view of the supporting apparatus of FIG. 5.

Referring to FIG. 5 and FIG. 7, in assembly of the supporting apparatus 20, the connecting portion 222 is received in the receiving space 243 of the receiving portion 240 of the connecting bracket 24. The pivoting plates 223 are attached to the inner surfaces of the connecting plates 249, respectively. The shafts 262 of the shaft member 26 pivotably extend through the shaft holes 2492 and 224. The two fingers of each torsion spring 27 resist against the corresponding connecting plate 249 and the connecting portion 222, respectively. Therefore, the supporting bracket 22 is pivotably mounted to the connecting bracket 24. The second end of the supporting bracket 22 opposite to the connecting portion 222 extends through the opening 292 of the cover 29. Four fasteners extend through the fixing holes 2482 and 2452, to be screwed into the screw holes 295 of the columns 294. The connecting bracket 24 is fixed to the front surface of the cover 29.

Figure 8:
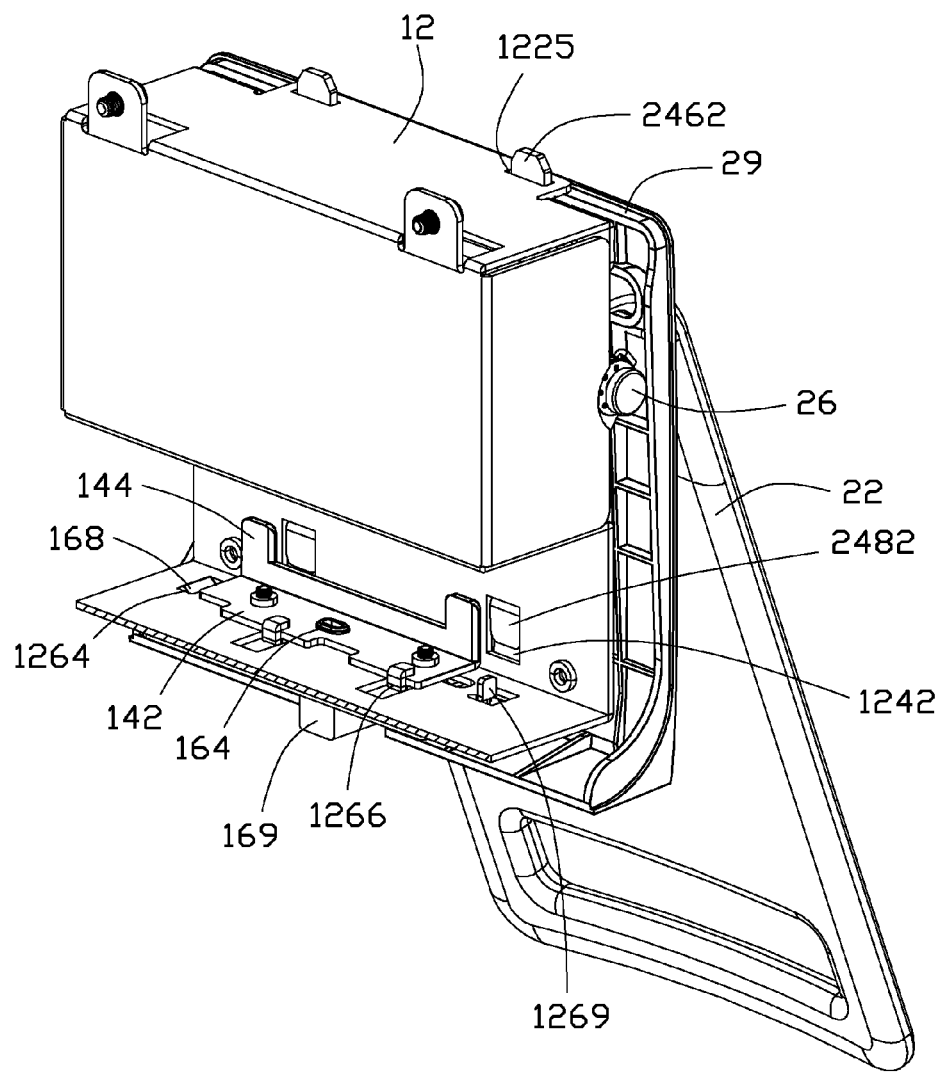
FIGS. 8-9 are isometric, cutaway views showing the process of assembling the electronic device of FIG. 1.
Figure 9:
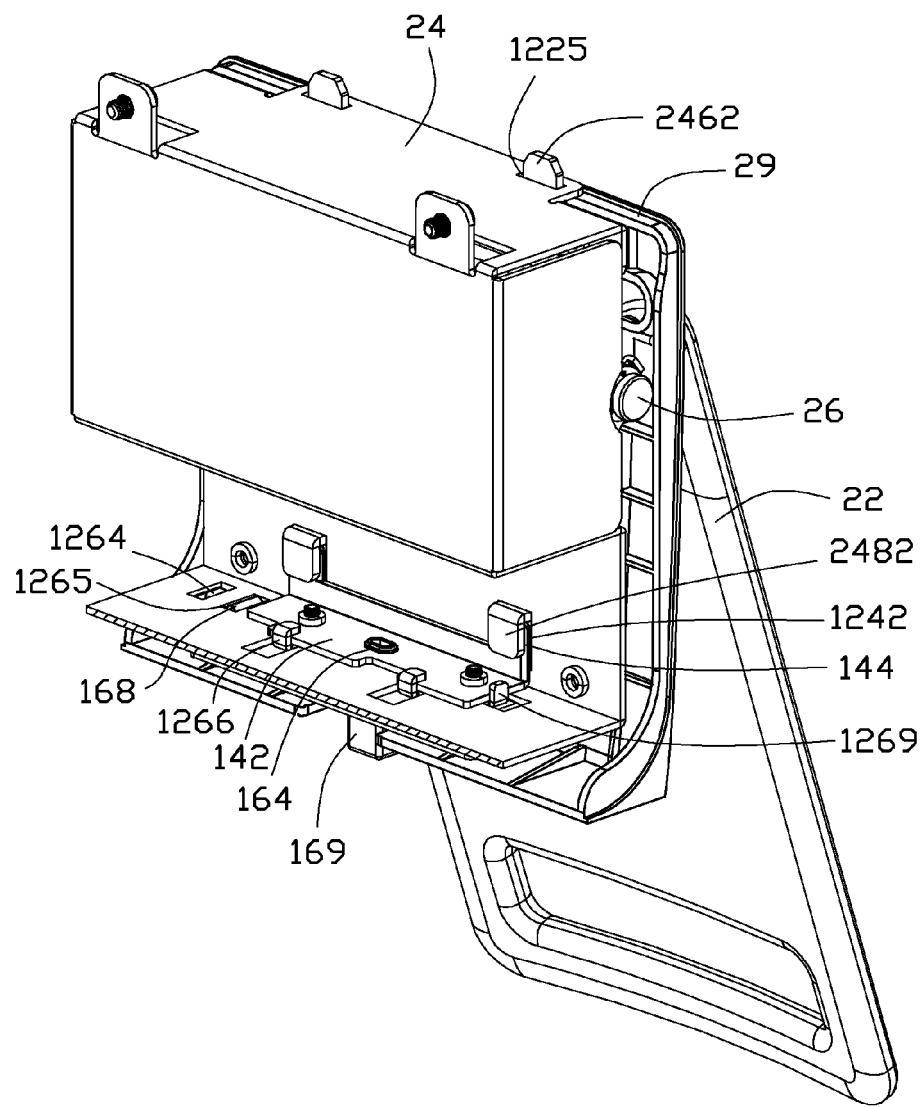

Referring to FIGS. 8-10, in assembly of the supporting apparatus 20 to the mounting apparatus 10, the operation block 170 is pushed to move away from the engaging piece 1269. The projection 169 of the tongue 168 is disengaged from the second engaging hole 1265, deforming the tongue 168, until the projection 169 aligns with the first engaging hole 1264. The tongue 168 is restored to bias the projection 169 to engage in the first engaging hole 1264. The stop pieces 144 are moved away from the corresponding connecting holes 1242. The receiving portion 240 is received in the receiving space 1223. The protrusions 2462 of the connecting bracket 24 are latched in the latching holes 1225 of the fixing bracket 12. The supporting apparatus 20 is pushed toward the mounting apparatus 10. The hooks 2484 extend through the corresponding connecting holes 1242. The operation block 170 is pushed toward the engaging piece 1269, the projection 169 is disengaged from the first engaging hole 1264, deforming the tongue 168, until the projection 169 aligns with the second engaging hole 1265. The tongue 168 is restored to bias the projection 169 to engage in the second engaging hole 1265. The stop pieces 144 move between the hooks 2484 and the connecting holes 1242 to be blocked by the hooks 2484. The engaging member 14 is blocked by the engaging piece 1269. The operation block 170 extends through the cutout 2962 of the cover 29. The supporting apparatus 20 is then assembled to the main body 40 through the mounting apparatus 10, and the supporting bracket 20 thus supports the main body 40.

When disassembling the supporting apparatus 20, the operation block 170 is pushed away from the engaging piece 1269, the projection 169 of the tongue 168 is disengaged from the second engaging hole 1265, and the tongue 168 is deformed. When the projection 169 engages into the first engaging hole 1264, the stop pieces 144 are disengaged from the hooks 2484. The supporting apparatus 20 moves away from the mounting apparatus 10, to allow the protrusions 2462 to disengage from the latching holes 1225. The main body 40 can still be hung on a wall through the fixing bracket 12 of the mounting apparatus 10, simply by removing the supporting apparatus 20.

Even though numerous characteristics and advantages of the embodiment(s) have been set forth in the foregoing description, together with details of the structures and functions of the embodiment(s), the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. An electronic device, comprising:
a main body;
a mounting apparatus to hang the main body to a wall, the mounting apparatus comprising a fixing bracket mounted to the main body, an engaging member slidably assembled to the fixing bracket, and an operation member mounted the engaging member, a first engaging hole and a second engaging hole are defined in an end of the fixing bracket; and
a supporting apparatus comprising a connecting bracket detachably mounted to the fixing bracket opposite to the engaging member, a supporting bracket mounted to the connecting bracket to support the main body to stand;
wherein the fixing bracket defines a connecting hole therein, the connecting bracket comprises a first hook aligning with the connecting hole, the engaging member comprises a stop piece, and wherein the operation member forms a resilient tongue, a projection extends from the resilient tongue, wherein when the operation member causes the engaging member to move relative to the fixing bracket to make the projection engage in the first engaging hole, the stop piece moves away from the connecting hole, the first hook extends through the connecting hole, and after the engaging member is moved relative to the fixing bracket to make the projection engage in the second engaging hole through the operation member, the stop piece moves between the connecting hole and the first hook, to engage with the first hook.

2. The electronic device of claim 1, wherein the main body defines a first recess in a rear side of the main body, the fixing bracket comprises a frame, a connecting panel extending down from a bottom side of the frame, and a supporting portion extending forward from a bottom side of the connecting panel, the connecting hole is defined in the connecting panel, the engaging member is slidably mounted on a top of the supporting portion, the first and second engaging holes are defined in the supporting portion, the operation member extends through the supporting portion from a bottom of the supporting portion to be fixed to the engaging member.

3. The electronic device of claim 2, wherein the frame is substantially box-shaped and comprises a first front wall, a first top wall extending rearward from a top side of the front wall, and a first bottom wall extending rearward from a bottom side of the first front wall, wherein the first front wall, the first top wall, and the first bottom wall cooperatively bound a receiving space, the connecting panel is extending down from a bottom side of bottom wall.

4. The electronic device of claim 3, wherein the connecting bracket comprises a receiving portion received in the receiving space, the receiving portion comprises a second front wall, a second top wall extending rearward from a top side of the second front wall, and a second bottom wall extending rearward from a bottom of the second front wall, a fixing plate extends down from a rear side of the bottom wall, the first hook is substantially L-shaped, and extends forward and down from a bottom side of the fixing plate.

5. The electronic device of claim 4, wherein two latching holes are defined in a rear side of the first top wall, two protrusions protrude up from a rear side of the second top wall, the protrusions are latched in the latching holes.

6. The electronic device of claim 4, wherein the supporting bracket is pivotably mounted to the connecting bracket.

7. The electronic device of claim 6, wherein a connecting portion extends from a first end of the supporting bracket, two pivoting plates extend from two opposite ends of the connecting portion, a first shaft hole is defined in each pivoting plate, two connecting plates extend up from two opposite ends of the second bottom wall, each connecting plate defines a second shaft hole therein, a shaft member pivotably extends through a corresponding first shaft hole and a corresponding second shaft hole.

8. The electronic device of claim 7, wherein the shaft member comprises a shaft pivotably extending through the first and second shaft holes, and a torsion spring fitting about the shaft, two ends of the torsion spring resist against the corresponding connecting plate and the connecting portion, respectively.

9. The electronic device of claim 8, wherein the supporting apparatus further comprises a cover fixed to the connecting bracket, a long opening is defined in the upper portion of the cover, the second end of the supporting bracket opposite to the connecting portion extends through the opening to be exposed.

10. The electronic device of claim 9, wherein a bottom plate extends forward from a bottom side of the cover, a cutout is defined in a middle of the bottom plate, the operation member comprises an operation block extending down from a bottom of the operation member, the operation block extends through the cutout of the cover, and be exposed out of the main body.

11. The electronic device of claim 3, wherein the supporting portion is substantially L-shaped, the supporting portion comprises a supporting plate perpendicularly extending forward from the bottom of the connecting panel, and an extension plate extending down from a front side of the supporting panel, an elongated and longitudinally-aligned first slide hole is defined in the supporting panel, the first and second engaging holes are defined in a first end of the supporting panel, the first and second engaging holes are in alignment with the first slide hole, the engaging member comprises a sliding panel, a fixing hole is defined in the sliding panel, the stop piece extends up from a rear side of the sliding panel, the operation member comprises a sliding plate, a fixing pole extends up from the sliding plate, the projection is formed at an end of the sliding plate, the fixing pole extends through the first slide hole, to be fixed into the fixing hole.

12. The electronic device of claim 11, wherein two elongated and longitudinally-aligned second slide holes are defined in the supporting portion at two opposite ends of the first slide hole, two screw holes are defined in two opposite ends of the sliding panel, in alignment with the second slide holes, two through holes are defined in the sliding plate at two opposite sides of the fixing hole of the sliding plate, two screws extend through the corresponding through holes and the corresponding second slide holes, to be screwed in the corresponding screw holes.

13. The electronic device of claim 11, wherein two substantially L-shaped second hooks extend up from the supporting plate, with a distal end of each hook facing to the connecting panel, the second hooks and the supporting panel cooperatively form a slide slot, to slidably receive the engaging member.

* * * * *